(12) United States Patent
Murakami et al.

(10) Patent No.: US 7,870,872 B2
(45) Date of Patent: Jan. 18, 2011

(54) CONTROLLING COOLING FLUID FLOW IN A COOLING SYSTEM WITH A VARIABLE INLINE NOZZLE

(75) Inventors: Vance B. Murakami, Los Gatos, CA (US); Wesley H. Stelter, San Bruno, CA (US); Robert M. Hintz, San Jose, CA (US); John M. Grisham, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 11/731,539

(22) Filed: Mar. 30, 2007

(65) Prior Publication Data

US 2008/0236690 A1    Oct. 2, 2008

(51) Int. Cl.
*F15D 1/04* (2006.01)

(52) U.S. Cl. .......................... 138/45; 138/46; 138/118
(58) Field of Classification Search ................ 138/118, 138/45, 46, 119; 251/4
See application file for complete search history.

(56) References Cited

U.S. PATENT DOCUMENTS

| 1,108,128 | A | * | 8/1914 | Buffum | ........................ | 138/45 |
| 4,092,010 | A | * | 5/1978 | Carlson, Jr. | ..................... | 251/4 |
| 4,523,737 | A | * | 6/1985 | Wentworth | ..................... | 251/4 |
| 7,066,211 | B2 | * | 6/2006 | Gustafsson | .................. | 138/119 |
| 7,140,406 | B2 | * | 11/2006 | Gustafsson | .................. | 141/114 |

* cited by examiner

*Primary Examiner*—Patrick F Brinson

(57) ABSTRACT

In a cooling system, a variable inline nozzle controls the flow of cooling fluid. The variable inline nozzle includes a composite fibrous tube through which the cooling fluid flows. Upon manipulation of the composite fibrous tube, a diameter of a portion of the composite fibrous tube is adjusted to control the flow of the cooling fluid.

29 Claims, 6 Drawing Sheets

CONTROLLING COOLING FLUID FLOW IN A COOLING SYSTEM WITH A VARIABLE INLINE NOZZLE

BACKGROUND

Some cooling systems, such as those required to cool electronic equipment, need to regulate the flow of cooling fluid through the system, so that the system doesn't provide too little or too much cooling capacity to the electronic equipment. Too little cooling will allow the electronic equipment to overheat, thereby causing underperformance by or damage to the electronic equipment or its surroundings. Too much cooling can consume too much power by the cooling system, generate condensation within the electronic equipment and/or allow unwanted phase changes to occur in the cooling fluid (e.g. if the cooling fluid is water), among other potential problems.

Some cooling systems employ flow-regulating devices, or orifices, inline with the cooling fluid path. Each flow-regulating device reduces the flow rate of the cooling fluid through the cooling system by a specified amount. Upon designing a cooling system for a given set of electronic devices, such as a rack-mounted computerized system, a flow-regulating device is selected that provides the necessary flow regulation depending on the cooling capacity of the cooling system and the anticipated level of heat generation by the electronic equipment.

If the electronic devices or a part of the cooling system is changed requiring a different flow rate, fluid velocity or static pressure for the cooling fluid, then the flow-regulating device may have to be replaced. Replacing the flow-regulating device requires turning off the flow of the cooling fluid both upstream and downstream from the flow-regulating device. Then the flow-regulating device can be removed with a minimum of cooling fluid loss. A new flow-regulating device is inserted, the lost cooling fluid is replaced and the flow of the cooling fluid is turned back on.

Since the flow of the cooling fluid must be turned off, the electronic equipment also has to be shut down, in order to prevent overheating of and possible damage to the electronic equipment and its surroundings. However, it is costly and time consuming to go through the operation of turning off the electronic equipment, turning off the cooling system, replacing the flow-regulating device, turning on the cooling system and turning back on the electronic equipment. Depending on circumstances, a considerable interruption of business operations can result when electronic equipment, such as computer server systems, is turned off for any period of time. It is thus with extreme reluctance that information technology (IT) managers take such drastic action within an enterprise.

DETAILED DESCRIPTION

Figure 1:
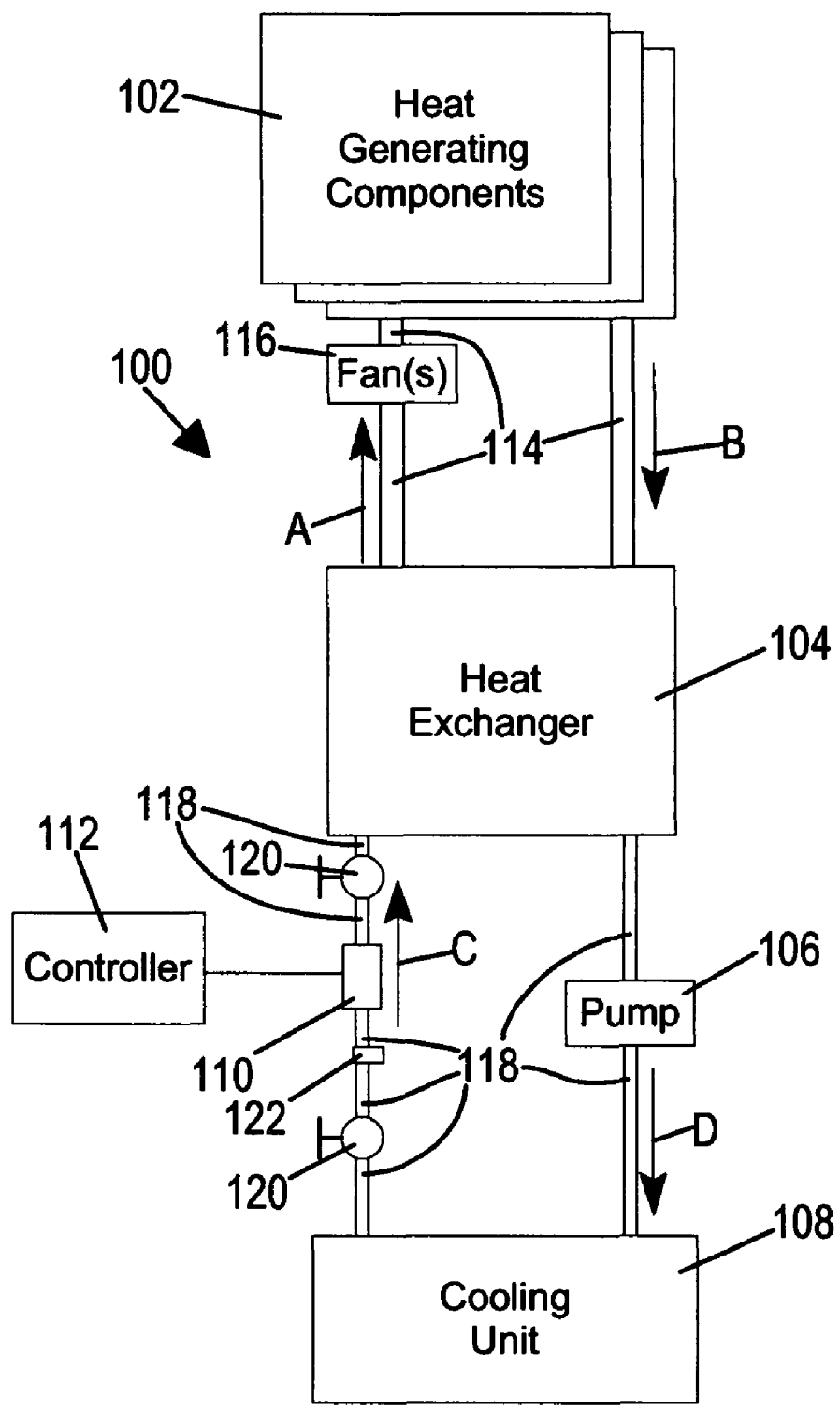
FIG. 1 is a simplified schematic of an exemplary cooling system with heat generating components and incorporating an embodiment of the present invention.
Figure 2:
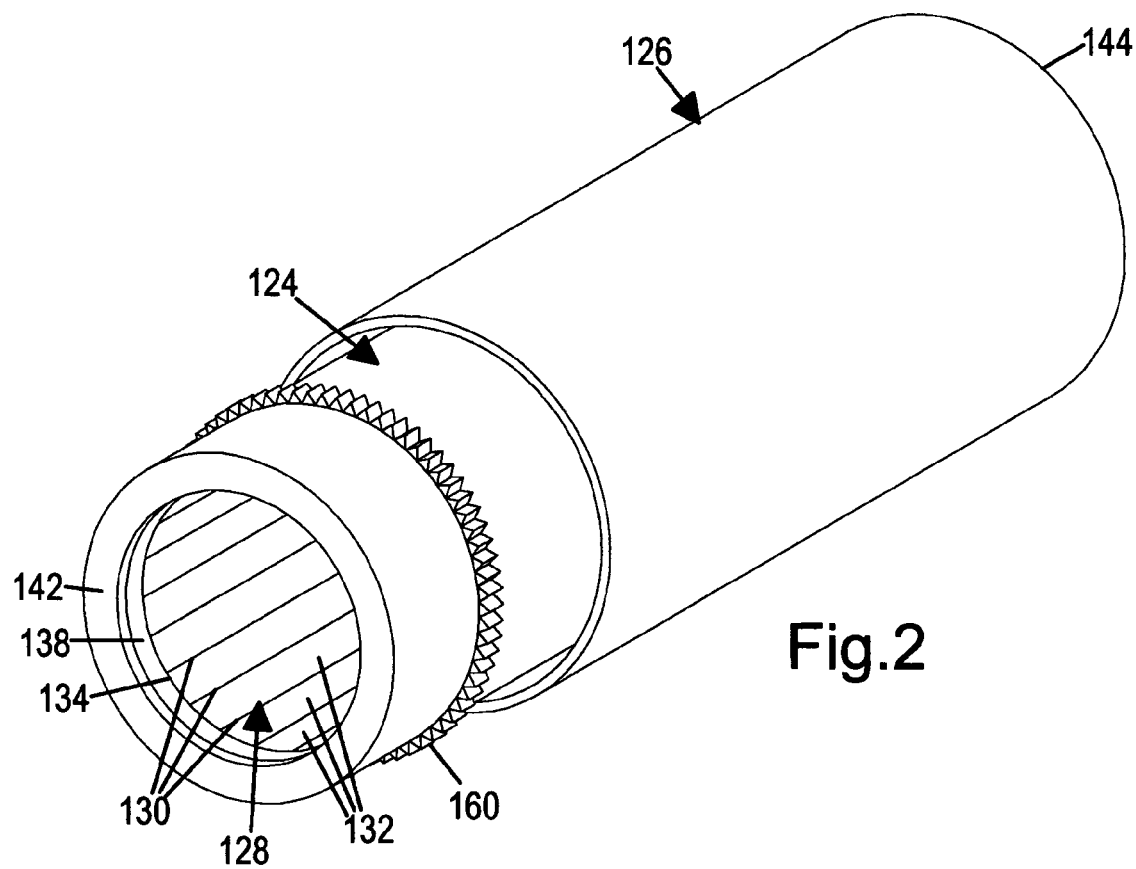
FIG. 2 is a simplified perspective view of a portion of an exemplary variable inline nozzle for use in the exemplary cooling system shown in FIG. 1 incorporating an embodiment of the present invention.
Figure 3:
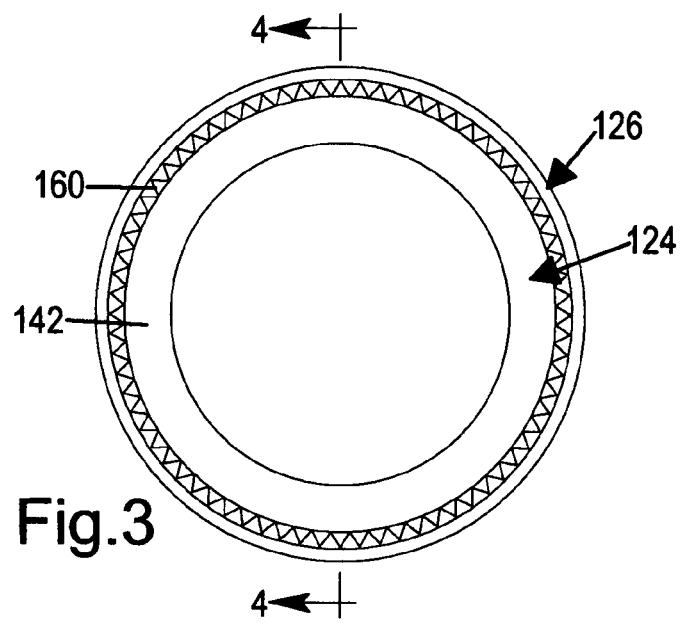
FIG. 3 is a simplified end view of the portion of the exemplary variable inline nozzle shown in FIG. 2 incorporating an embodiment of the present invention.

An exemplary cooling system 100 for cooling heat generating electronic components 102, such as rack-based computer-related devices, is shown in FIG. 1 incorporating an embodiment of the present invention (as described below). The cooling system 100 generally includes a heat exchanger 104, a pump 106, a cooling unit 108, a variable inline nozzle 110 and a controller 112, among other components. The variable inline nozzle 110 is inline with a cooling fluid flow path in the cooling system 100. The variable inline nozzle 110 regulates the flow rate of the cooling fluid that flows in the flow path through the heat exchanger 104, the pump 106, the cooling unit 108 and the variable inline nozzle 110. The variable inline nozzle 110 can vary the amount or degree to which it regulates or restricts the flow of the cooling fluid, as described below. In this manner, the variable inline nozzle 110 can be used over a much greater range of desired flow rates for the cooling fluid than can a flow-regulating device that cannot be varied. Therefore, when the cooling capacity requirements change for the cooling system 100, e.g. when the electrical power consumption of the heat generating components 102 changes, or if a different fluid velocity or static pressure is required, the variable inline nozzle 110 can be adjusted for a different flow rate, instead of being replaced, under a greater range of conditions than can a non-variable flow-regulating device. Thus, the need to shut down the heat generating components 102, and potentially interrupt significant business operations, occurs less often when the variable inline nozzle 110 is used in the cooling system 100 than when a non-variable flow-regulating device is used.

The cooling fluid needs to be kept within a specified range for a variety of reasons. In the case of water as the cooling fluid, for instance, care must be taken to ensure that the water does not freeze or vaporize in the flow path to ensure proper functioning of the cooling system 100. For "phase-change" cooling fluids, on the other hand, the temperature range of the cooling fluid must be such that the cooling fluid can properly evaporate and condense as it cycles through the cooling system 100. Additionally, since the heat generating components 102 (and other surrounding components) are electronic and can be damaged by water, it is undesirable for condensation of ambient moisture to occur on these components 102. Therefore, when the heat generation conditions change (e.g. some components 102 are added or removed), it is vitally important that the cooling capacity of the cooling system 100 change in order to keep the components 102 and its surroundings above the condensation point. Thus, the variable inline nozzle 110 serves to be able to rapidly and efficiently respond to such changing conditions by adjusting the flow rate, and hence the cooling capacity, of the cooling fluid.

The heat generating components 102 are cooled by air flowing through or across the components 102. The cooling air is transferred in a path (arrows A and B) from the heat exchanger 104 to the heat generating components 102 and back again through a variety of ducts, conduits and passageways 114 by one or more fans 116. The fan(s) 116 are located at any appropriate point(s) within the path of the flowing air.

Within the heat exchanger 104, the temperature of the cooling air is reduced by passing the heat to the cooling fluid, such as water, Freon, etc. The cooling fluid is forced through the flow path (arrows C and D) from the cooling unit 108 to the heat exchanger 104 and back again through a variety of pipes, tubes and hoses 118. In the cooling unit 108 (e.g. an evaporator, etc.), the cooling fluid is cooled back down.

The pump 106 is located at any appropriate point in the path of the cooling fluid. The pump 106 forces the cooling fluid to flow through the cooling fluid path. However, adjusting the operation of the pump 106 to increase or decrease the flow rate of the cooling fluid is not a preferred option, because under some circumstances and with some types of pumps, better control of the flow rate and/or better performance of the pump is achieved with a separate flow-regulating device, hence the need for the variable inline nozzle 110.

The controller 112 is electrically attached to the variable inline nozzle 110. The controller 112 may be a computer, or other appropriate device, that can control the amount to which the variable inline nozzle 110 restricts or regulates the flow rate of the cooling fluid, as exemplified below. The controller 112 may be set by a user to a specified value to which the variable inline nozzle 110 is adjusted. Alternatively, the controller 112 may be dynamically controlled according to an appropriate algorithm that receives various inputs indicative of relevant parameters, such as the temperature or power consumption of the heat generating components 102 and the ambient air temperature and humidity, among other possible inputs.

Optional stop valves 120 may be placed inline at upstream and downstream locations from the variable inline nozzle 110. Additionally, an optional tap 122 may be placed between the stop valves 120. Such stop valves 120 are not optional, but required, for cooling systems having non-variable flow-regulating devices, since the non-variable flow-regulating devices have to be replaced when the cooling requirements of the cooling systems change. In such situations, the stop valves 120 are closed to stop the flow of the cooling fluid. Then the flow-regulating device can be removed without significant loss of the cooling fluid. After installing a new flow-regulating device, the air that has gotten into the pipes, tubes and/or hoses 118 between the stop valves 120 is evacuated at the tap 122. Additionally, any new cooling fluid needed to replace cooling fluid that was lost during this operation is injected at the tap 122. In the cooling system 100 having the variable inline nozzle 110, on the other hand, the stop valves 120 and the tap 122 may not be needed, since the variable inline nozzle 110 enables operation of the cooling system 100 over a much greater range of conditions than does the non-variable flow-regulating device. However, the stop valves 120 and the tap 122 may be included in the cooling system 100 in case the variable inline nozzle 110 ever needs to be removed, serviced or replaced.

According to various embodiments, the variable inline nozzle 110 generally includes inner and outer tubular sleeves 124 and 126 surrounding a composite fibrous tube 128, as shown in FIGS. 2-6. The inner and outer sleeves 124 and 126 generally overlap to form a cylindrical space within which the composite fibrous tube 128 is disposed. The composite fibrous tube 128 generally has longitudinally extending fibers 130 (FIGS. 2, 4-6) and a nonporous flexible material 132 between the fibers 130. The composite fibrous tube 128 is attached at its ends 134 and 136 (FIGS. 4 and 5) to rings 138 and 140, respectively, which are attached to circular faces 142 and 144, respectively, of the sleeves 124 and 126, respectively. The cooling fluid flows through the composite fibrous tube 128. O-rings 146 and 148 (FIGS. 4 and 5) seated in grooves 150 and 152, respectively, in inner sleeve 124 seal the gap between the sleeves 124 and 126 while allowing them to rotate and move back and forth with respect to each other. The composite fibrous tube 128 and internal fluid pressure generally hold the sleeves 124 and 126 in the positions shown and prevent the sleeves 124 and 126 from moving too far with respect to each other.

Figure 4:
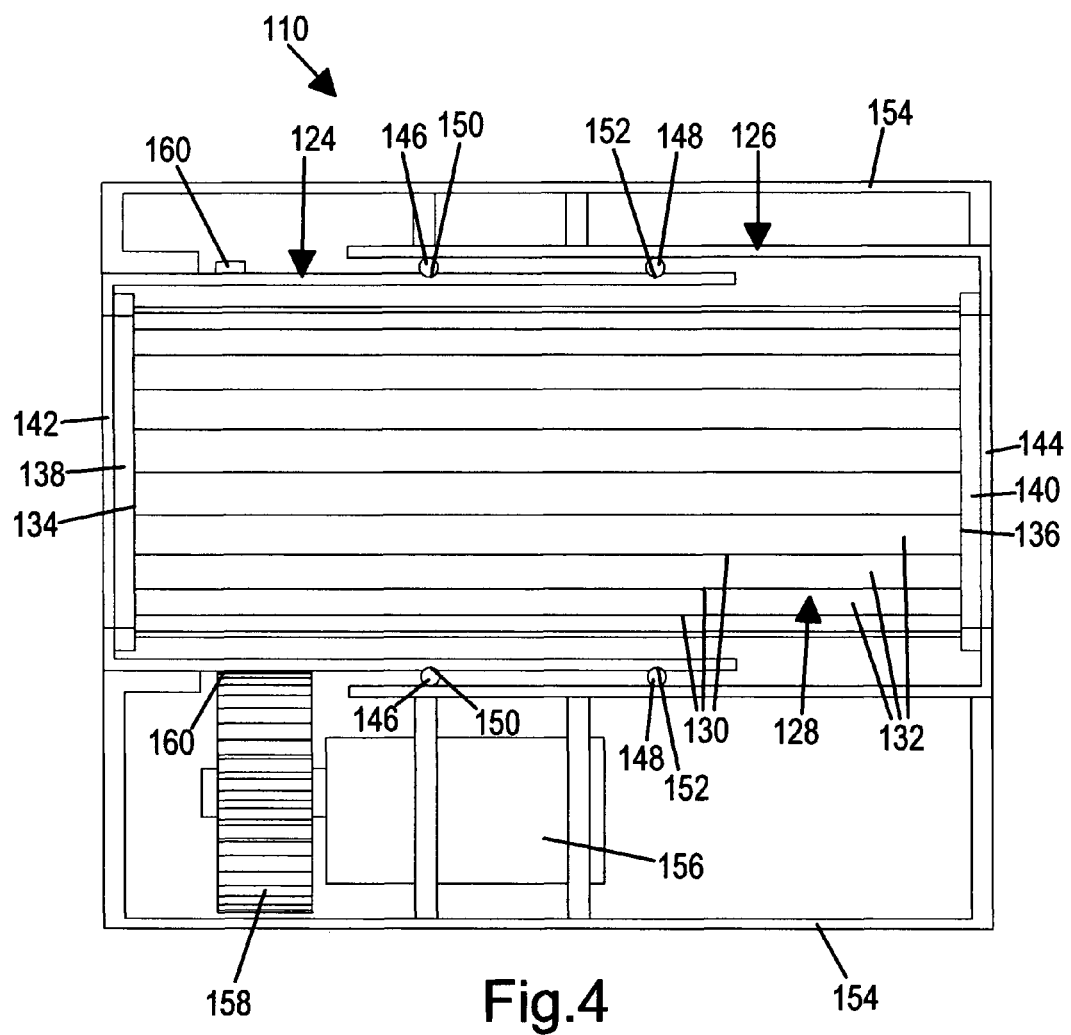
FIG. 4 is a simplified cross section view taken along section line 4-4 in FIG. 3 of the portion of the exemplary variable inline nozzle shown in FIGS. 2 and 3 and showing additional components of the exemplary variable inline nozzle incorporating an embodiment of the present invention.
Figure 5:
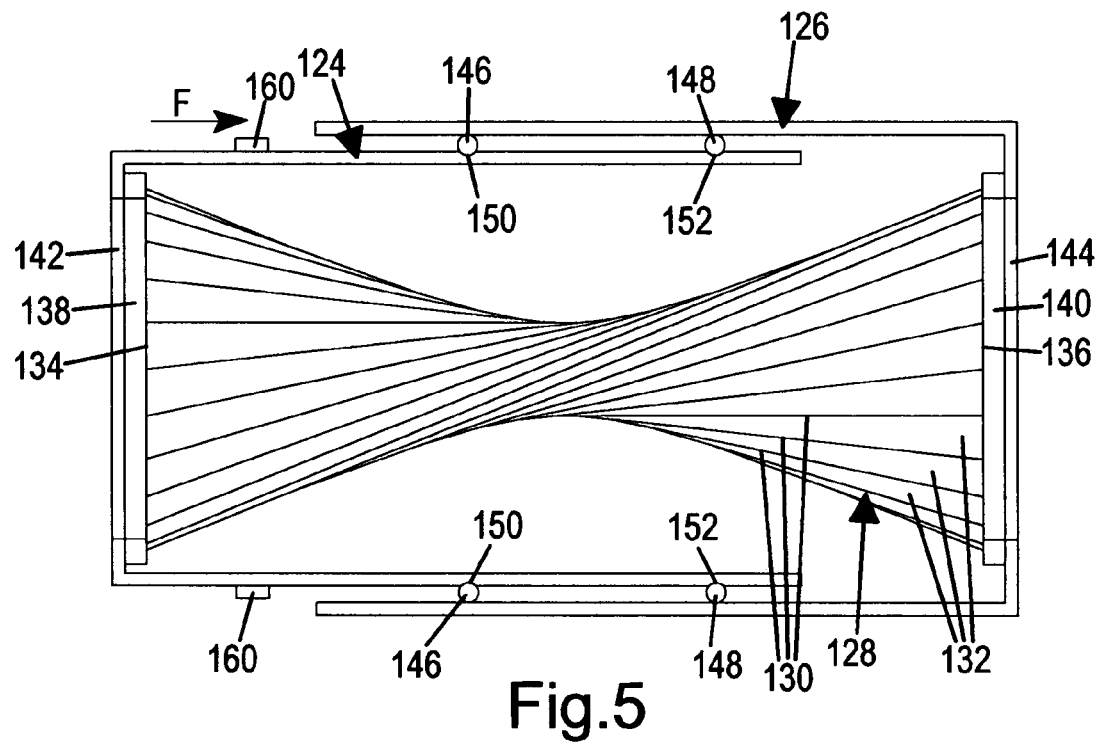
FIG. 5 is another simplified cross section view taken along section line 4-4 in FIG. 3 of the portion of the exemplary variable inline nozzle shown in FIGS. 2 and 3 in another configuration incorporating an embodiment of the present invention.

The variable inline nozzle 110 also includes an enclosure 154 housing the sleeves 124 and 126 and a stepper motor 156, as shown in FIG. 4. The motor 156 and one of the sleeves (e.g. outer sleeve 126) are fixed inside the enclosure 154. The motor 156 has a gear 158 mounted on it. One of the sleeves (e.g. inner sleeve 124) has a matching gear 160 (FIGS. 2-4) on it that is engaged by the motor 156 and gear 158. In this manner, the motor 156 can manipulate, or concentrically rotate, one of the sleeves (e.g. inner sleeve 124) relative to the other sleeve (e.g. outer sleeve 126). It is understood, however, that the present invention is not limited to this mechanism for rotating the sleeves 124 and 126 relative to each other, but includes any appropriate mechanisms or means for this function.

Figure 6:
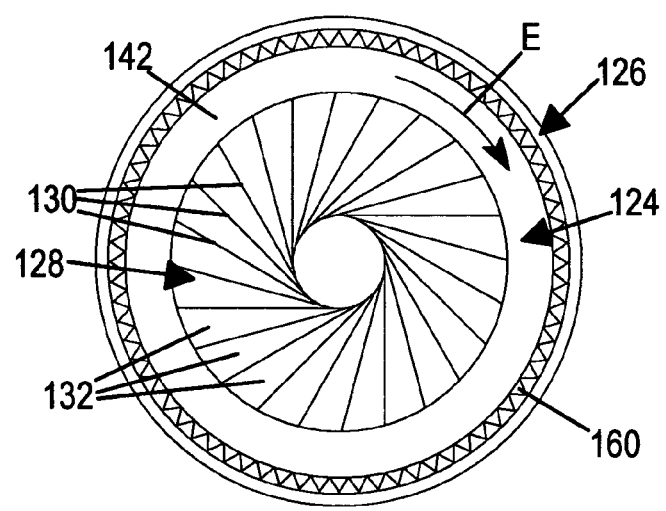
FIG. 6 is another simplified end view of the portion of the exemplary variable inline nozzle shown in FIGS. 2 and 3 in another configuration incorporating an embodiment of the present invention.

According to this embodiment, upon operating the motor 156 in response to signals from the controller 112, the inner sleeve 124 is rotated relative to the outer sleeve 126, e.g. in the direction of arrow E in FIG. 6. The composite fibrous tube 128 is thus twisted (and shortened slightly in the direction of arrow F, FIG. 5). In this manner, the fibers 130 converge at about a midpoint, or center point, of the composite fibrous tube 128. (See FIGS. 5 and 6.) The nonporous flexible material 132 is thus compressed into folds or shrunk from a stretched-out condition. The diameter of the mid portion of the composite fibrous tube 128 is thereby adjusted smaller. As a result, the flow rate of the cooling fluid is restricted, or decreased. Upon reversing the rotation of the inner sleeve 124, the fibers 130 diverge back toward the position shown in FIGS. 3 and 4, and the flow rate of the cooling fluid is increased. In this manner, the variable inline nozzle 110, according to signals from the controller 112, controls the flow, or flow rate, of the cooling fluid through the cooling system 100.

Figure 7:
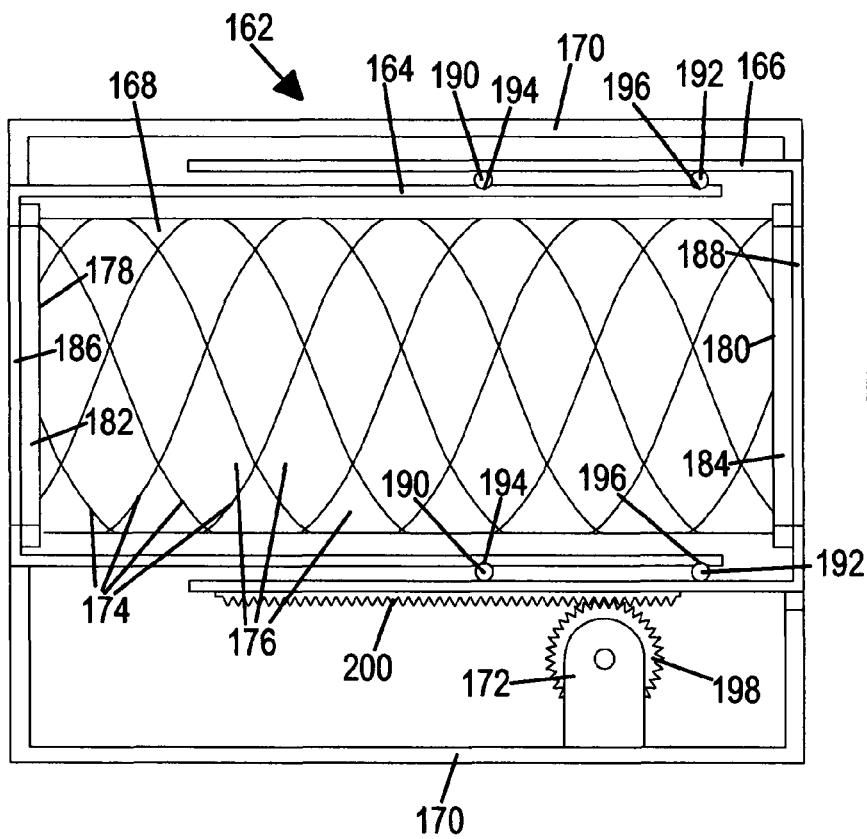
FIG. 7 is a simplified cross section view of an alternative embodiment for portions of another exemplary variable inline nozzle for use in the exemplary cooling system shown in FIG. 1 incorporating an alternative embodiment of the present invention.
Figure 8:
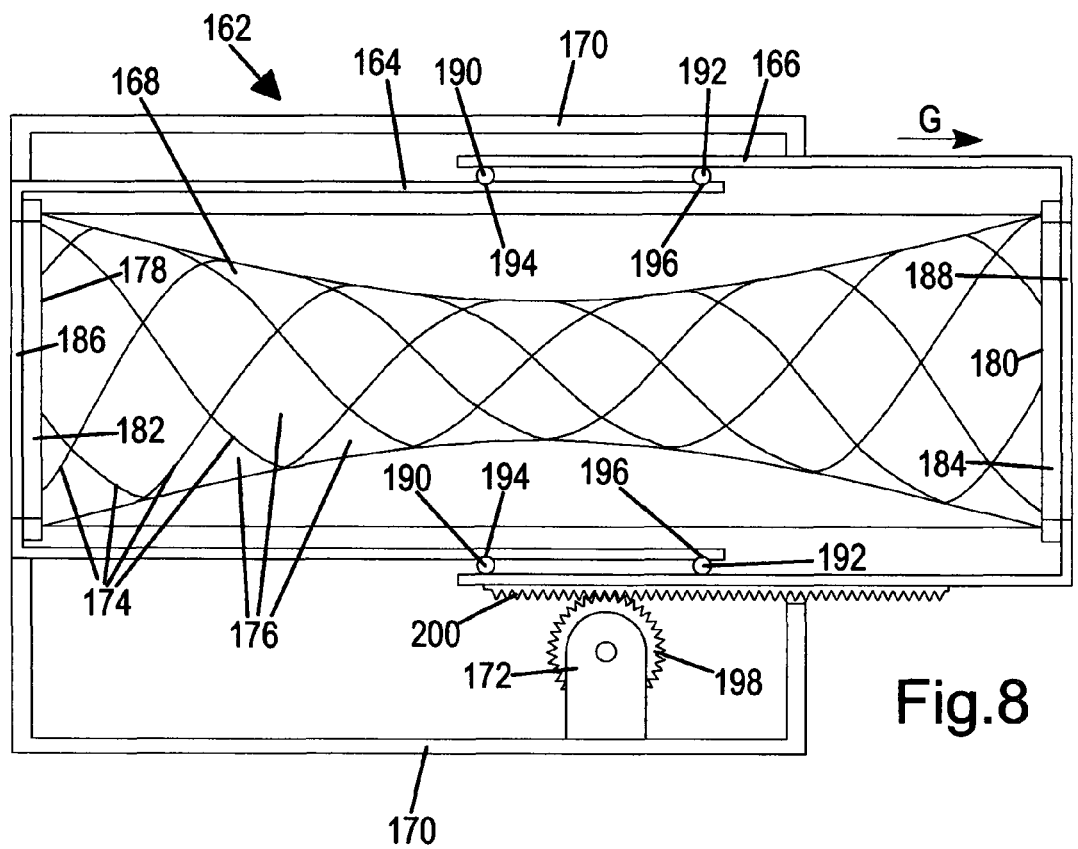
FIG. 8 is a simplified cross section view of the exemplary variable inline nozzle shown in FIG. 7 in another configuration incorporating an alternative embodiment of the present invention.

According to an alternative embodiment, as shown in FIGS. 7 and 8, a variable inline nozzle 162 (used in the cooling system 100 in place of the variable inline nozzle 110) generally includes inner and outer sleeves 164 and 166, a composite fibrous tube 168, an enclosure 170 and a stepper motor 172. The inner and outer sleeves 164 and 166 generally overlap to form a cylindrical space within which the composite fibrous tube 168 is disposed. The composite fibrous tube 168 comprises fibers 174 woven together and a nonporous flexible material 176 between the fibers 174. The ends 178 and 180 of the composite fibrous tube 168 are attached to rings 182 and 184, respectively, which are attached to faces 186 and 188, respectively, of the sleeves 164 and 166, respectively. The cooling fluid flows through the composite fibrous tube 168. O-rings 190 and 192 seated in grooves 194 and 196, respectively, in inner sleeve 164 seal the gap between the sleeves 164 and 166 while allowing them to move back and forth with respect to each other. The composite fibrous tube 168 and internal fluid pressure generally hold the sleeves 164 and 166 in the positions shown and prevent the sleeves 164 and 166 from moving too far with respect to each other.

The enclosure 170 houses the sleeves 164 and 166 and the motor 172. The motor 172 and one of the sleeves (e.g. inner sleeve 164) are fixed inside the enclosure 170. The motor 172 has a gear 198 mounted on it. One of the sleeves (e.g. outer sleeve 166) has a matching worm gear 200 on it that is engaged by the motor 172 and gear 198. In this manner, the motor 172 can manipulate, or move, one of the sleeves (e.g. outer sleeve 166) longitudinally back and forth relative to the other sleeve (e.g. inner sleeve 164). The manipulation of the composite fibrous tube 168 thus involves lengthening and shortening of the composite fibrous tube 168. It is understood, however, that the present invention is not limited to this mechanism for moving the sleeves 164 and 166 relative to each other, but includes any appropriate mechanisms or means for this function.

According to this embodiment, upon operating the motor 172 in response to signals from the controller 112, the outer sleeve 166 is moved longitudinally relative to the inner sleeve 164, e.g. in the direction of arrow G in FIG. 8. The composite fibrous tube 168 is thus lengthened, or stretched, within the sleeves 164 and 166. In this manner, the fibers 174 converge at about a midpoint, or center point, of the composite fibrous tube 168. The nonporous flexible material 176 is accordingly stretched-out longitudinally and, at the midpoint of the composite fibrous tube 168, is compressed radially. The diameter of the mid portion of the composite fibrous tube 168 is thereby adjusted smaller. As a result, the flow rate of the cooling fluid is restricted, or decreased. Upon reversing the movement of the outer sleeve 166, the fibers 174 diverge back toward the position shown in FIG. 7, and the flow rate of the cooling fluid is increased. In this manner, the variable inline nozzle 162, according to signals from the controller 112, controls the flow, or flow rate, of the cooling fluid through the cooling system 100.

Figure 9:
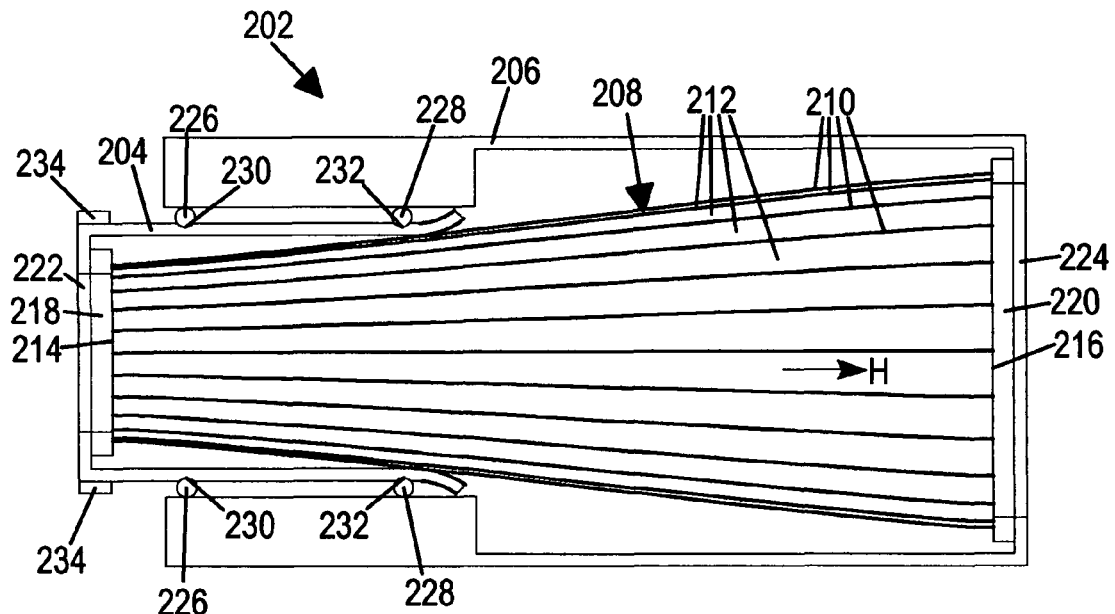
FIG. 9 is a simplified cross section view of another alternative embodiment for portions of another exemplary variable inline nozzle for use in the exemplary cooling system shown in FIG. 1 incorporating another alternative embodiment of the present invention.
Figure 10:
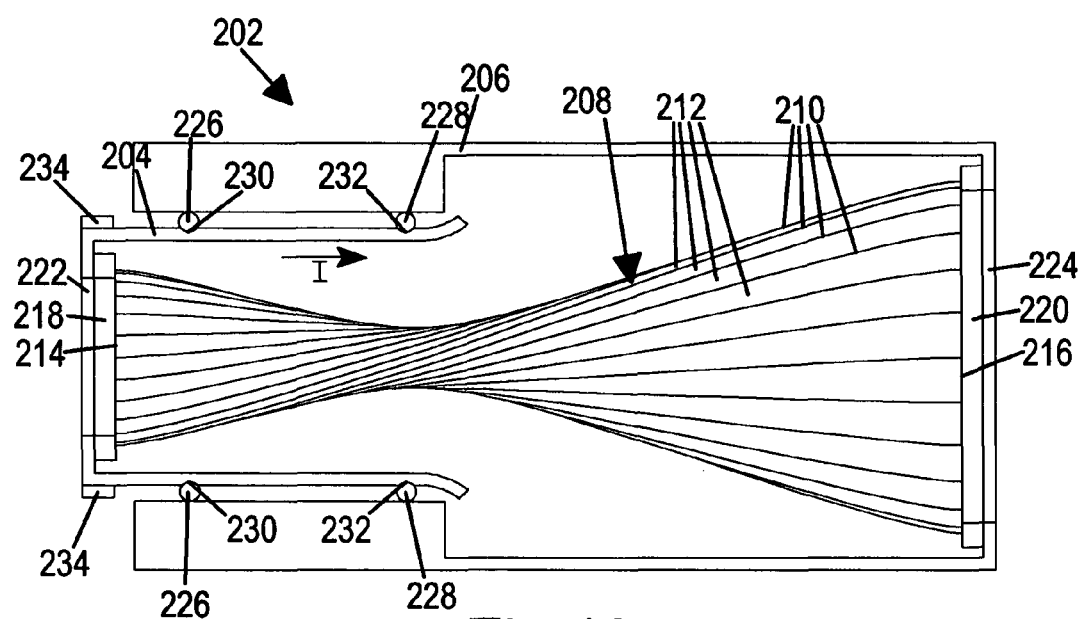
FIG. 10 is a simplified cross section view of the exemplary variable inline nozzle shown in FIG. 9 in another configuration incorporating an alternative embodiment of the present invention.

According to another alternative embodiment, as shown in FIGS. 9 and 10, a variable inline nozzle 202 (used in the cooling system 100 in place of the variable inline nozzle 110) generally includes inner and outer sleeves 204 and 206 and a composite fibrous tube 208. The inner and outer sleeves 204 and 206 generally overlap to form a cylindrical space within which the composite fibrous tube 208 is disposed. (The variable inline nozzle 202 may also have an enclosure and a motor similar to the enclosure 154 and the motor 156, shown in FIG. 4.) The composite fibrous tube 208 generally has longitudinally extending fibers 210 and a nonporous flexible material 212 between the fibers 210. The composite fibrous tube 208 is attached at its ends 214 and 216 to rings 218 and 220, respectively, which are attached to circular faces 222 and 224, respectively, of the sleeves 204 and 206, respectively. O-rings 226 and 228 seated in grooves 230 and 232, respectively, in inner sleeve 204 seal the gap between the sleeves 204 and 206 while allowing them to rotate and move back and forth with respect to each other. The composite fibrous tube 208 and internal fluid pressure generally hold the sleeves 204 and 206 in the positions shown and prevent the sleeves 204 and 206 from moving too far with respect to each other.

The end 214 of the composite fibrous tube 208 has a smaller diameter than the other end 216. Therefore, when the cooling fluid flows through the composite fibrous tube 208 in the direction of arrow H, the variable inline nozzle 202 is "divergent." Thus, the flow velocity decreases as the diameter of the flow path through the variable inline nozzle 202 increases. On the other hand, when the cooling fluid flows through the composite fibrous tube 208 in the direction opposite of arrow H, the variable inline nozzle 202 is "convergent." Thus, the flow velocity increases as the diameter of the flow path through the variable inline nozzle 202 decreases.

One of the sleeves (e.g. inner sleeve 204) has a gear 234 on it that can be engaged by a motor and gear, such as the motor 156 and gear 158 in FIG. 4. In this manner, the motor 156 can rotate one of the sleeves (e.g. inner sleeve 204) relative to the other sleeve (e.g. outer sleeve 206). It is understood, however, that the present invention is not limited to this mechanism for rotating the sleeves 204 and 206 relative to each other, but includes any appropriate mechanisms or means for this function.

According to this embodiment, upon rotating the inner sleeve 204 relative to the outer sleeve 206, the composite fibrous tube 208 is twisted (and shortened slightly in the direction of arrow 1, FIG. 10). In this manner, the fibers 210 converge at about a midpoint of the composite fibrous tube 208. The nonporous flexible material 212 is thus compressed into folds or shrunk from a stretched-out condition. The diameter of the mid portion of the composite fibrous tube 208 is thereby adjusted smaller. As a result, the flow rate of the cooling fluid is restricted, or decreased. Additionally, if the flow of the cooling fluid is in the direction of arrow H, then the relative divergence of the composite fibrous tube 208 is greater. On the other hand, if the flow of the cooling fluid is in the opposite direction of arrow H, then the relative convergence of the composite fibrous tube 208 is greater. Upon reversing the rotation of the inner sleeve 204, the fibers 210 diverge back toward the position shown in FIG. 9, the flow rate of the cooling fluid is increased and the relative convergence/divergence of the composite fibrous tube 208 returns to that of FIG. 9. In this manner, the variable inline nozzle 202, according to signals from the controller 112 (FIG. 1), controls the flow, or flow rate, of the cooling fluid through the cooling system 100, as well as the relative convergence/divergence of the composite fibrous tube 208.

We claim:

1. A cooling system comprising:

a cooling fluid flow path through which a cooling fluid flows;

a variable inline nozzle inline with the cooling fluid flow path and comprising a composite fibrous tube through which the cooling fluid flows; and an inner sleeve attached to a first end of the composite fibrous tube and an outer sleeve attached to a second end of the composite fibrous tube;

wherein upon manipulation of the composite fibrous tube, a diameter of a portion of the composite fibrous tube is adjusted to control the flow of the cooling fluid.

2. A cooling system as defined in claim 1, wherein: the inner sleeve and the outer sleeve can rotate concentrically with respect to each other to twist the composite fibrous tube.

3. A cooling system as defined in claim 1, wherein: the inner sleeve and the outer sleeve can move longitudinally with respect to each other to lengthen the composite fibrous tube.

4. A cooling system as defined in claim 1, wherein: the inner sleeve and the outer sleeve overlap to form a cylindrical space within which the composite fibrous tube is disposed.

5. A cooling system as defined in claim 1, wherein: the manipulation of the composite fibrous tube involves twisting of the composite fibrous tube.

6. A cooling system as defined in claim 1, wherein: the composite fibrous tube comprises longitudinally extending fibers and a nonporous flexible material between the fibers.

7. A cooling system as defined in claim 6, wherein: when twisted, fibers of the composite fibrous tube converge toward a midpoint of the composite fibrous tube.

8. A cooling system as defined in claim 1, wherein: the manipulation of the composite fibrous tube involves lengthening of the composite fibrous tube.

9. A cooling system as defined in claim 1, wherein: the composite fibrous tube comprises fibers woven together and a nonporous flexible material between the fibers.

10. A cooling system as defined in claim 8, wherein: when lengthened, fibers of the composite fibrous tube converge toward a midpoint of the composite fibrous tube.

11. A cooling system as defined in claim 1, wherein: the diameter of the composite fibrous tube converges from a first dimension to a second dimension smaller than the first dimension, in a direction of the flow of the cooling fluid.

12. A cooling system as defined in claim 1, wherein: the diameter of the composite fibrous tube diverges from a first dimension to a second dimension larger than the first dimension, in a direction of the flow of the cooling fluid.

13. A variable inline nozzle for a cooling system, comprising:
a composite fibrous tube through which cooling fluid of the cooling system can flow;
wherein upon manipulation of first and second ends of the composite fibrous tube relative to each other, a diameter of the composite fibrous tube is adjusted to control the flow of the cooling fluid.

14. A variable inline nozzle as defined in claim 13, further comprising:
an inner sleeve attached to the first end of the composite fibrous tube; and
an outer sleeve attached to the second end of the composite fibrous tube;
wherein upon manipulation of the sleeves relative to each other, the diameter of the composite fibrous tube is reduced to restrict the flow of the cooling fluid.

15. A variable inline nozzle as defined in claim 14, wherein:
the inner sleeve and the outer sleeve can rotate concentrically with respect to each other to twist the composite fibrous tube.

16. A variable inline nozzle as defined in claim 14, wherein:
the inner sleeve and the outer sleeve can move longitudinally with respect to each other to lengthen the composite fibrous tube.

17. A variable inline nozzle as defined in claim 13, wherein:
the manipulation involves twisting the composite fibrous tube.

18. A variable inline nozzle as defined in claim 17, wherein:
the composite fibrous tube comprises longitudinally extending fibers and a nonporous flexible material between the fibers.

19. A variable inline nozzle as defined in claim 13, wherein:
the manipulation involves lengthening the composite fibrous tube.

20. A variable inline nozzle as defined in claim 19, wherein:
the composite fibrous tube comprises fibers woven together and a nonporous flexible material between the fibers.

21. A variable inline nozzle for a cooling system, comprising:
a tubular means for constricting flow of a cooling fluid through the constricting tubular means, the constricting tubular means having fibers and a nonporous means between the fibers for containing the flow of the cooling fluid; and
a means for manipulating first and second ends of the constricting tubular means, relative to each other, to adjust a diameter of the constricting tubular means to control the flow of the cooling fluid.

22. A variable inline nozzle as defined in claim 21, wherein:
the manipulating means is for twisting the constricting tubular means.

23. A variable inline nozzle as defined in claim 21, wherein:
the manipulating means is for lengthening the constricting tubular means.

24. A variable inline nozzle as defined in claim 21, further comprising:
a means for surrounding the constricting tubular means and having first and second portions that attach to the first and second ends, respectively, of the constricting tubular means;
and wherein the manipulating means manipulates the first and second portions of the surrounding means relative to each other to manipulate the first and second ends of the constricting tubular means.

25. A method of controlling a flow of a cooling fluid in a cooling system, comprising:
providing a variable inline nozzle comprising a composite fibrous tube;
flowing the cooling fluid through the composite fibrous tube of the variable inline nozzle; and manipulating first and second ends of the composite fibrous tube to cause a diameter of the composite fibrous tube to change to cause a flow rate of the cooling fluid to change.

26. A method as defined in claim 25, wherein:
the manipulating involves manipulating inner and outer sleeves attached to the first and second ends, respectively.

27. A method as defined in claim 25, wherein:
the manipulating involves twisting the composite fibrous tube.

28. A method as defined in claim 25, wherein:
the manipulating involves lengthening the composite fibrous tube.

29. A method as defined in claim 25, wherein:
the composite fibrous tube comprises fibers and a nonporous flexible material between the fibers that flexes in accordance with movement of the fibers upon the manipulating of the first and second ends of the composite fibrous tube.

* * * * *